United States Patent [19]

Donoghue

[11] 4,106,673
[45] Aug. 15, 1978

[54] APPARATUS FOR MEASURING AND DISPENSING LIQUID

[76] Inventor: Robert J. Donoghue, 4 Burnwood Dr., Bloomfield, Conn. 06002

[21] Appl. No.: 779,630

[22] Filed: Mar. 21, 1977

[51] Int. Cl.² .............................................. B65D 37/00
[52] U.S. Cl. .................................... 222/207; 222/211; 222/215
[58] Field of Search ................ 222/207, 212, 211, 215

[56] References Cited

U.S. PATENT DOCUMENTS

| | | | |
|---|---|---|---|
| 3,246,807 | 4/1966 | Micallet | 222/207 |
| 3,874,561 | 4/1975 | Zackheim et al. | 222/207 |

*Primary Examiner*—Allen N. Knowles

[57] ABSTRACT

An apparatus for measuring and dispensing liquid is provided by the combination of a reservoir container having a flexible wall and measuring and dispensing means disposed on the reservoir container. The measuring and dispensing means comprises an outer wall member and an inner wall member, the inner wall member being disposed within the outer wall member and spaced therefrom to define liquid passage means between the outer wall member and the inner wall member, and the inner wall member defines a measuring chamber therewithin. Liquid passage means are provided in liquid communication with the liquid passage and the measuring chamber, and conduit means are disposed in the reservoir container and in liquid communication with the liquid passage means.

10 Claims, 7 Drawing Figures

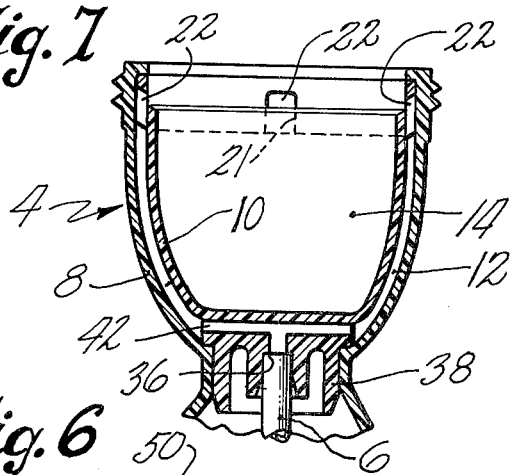
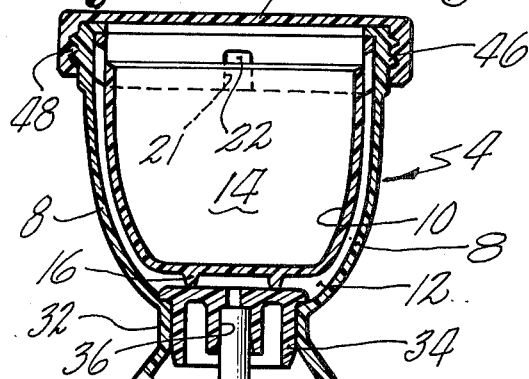
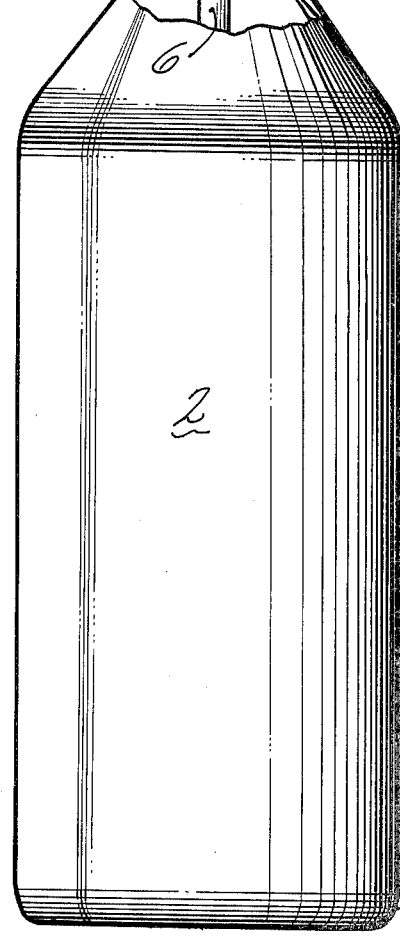
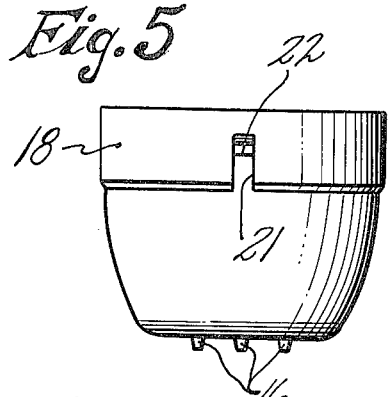
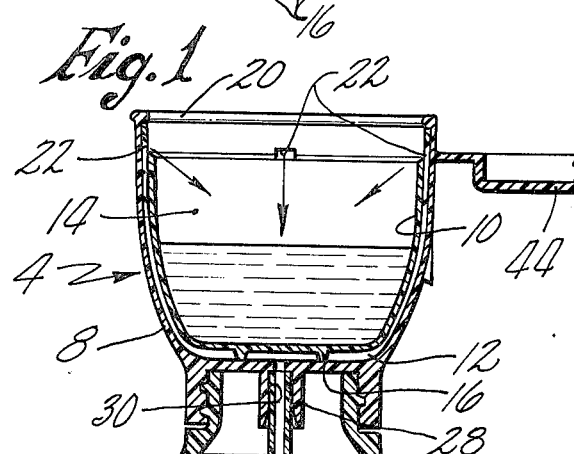
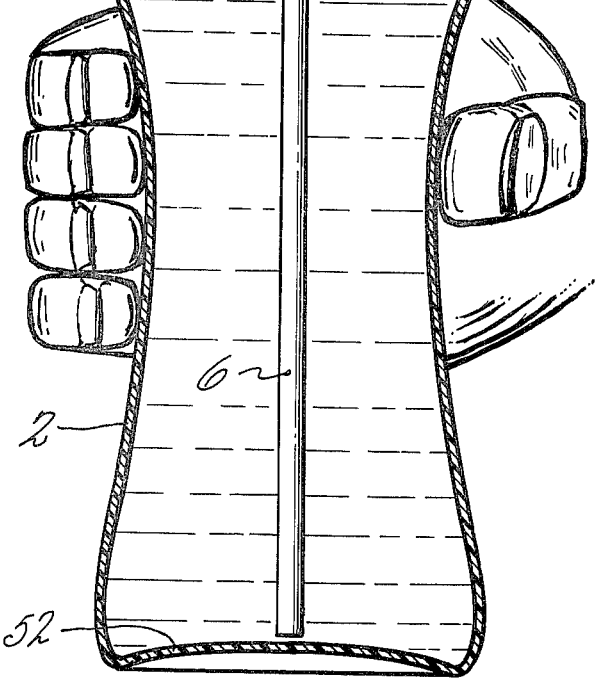

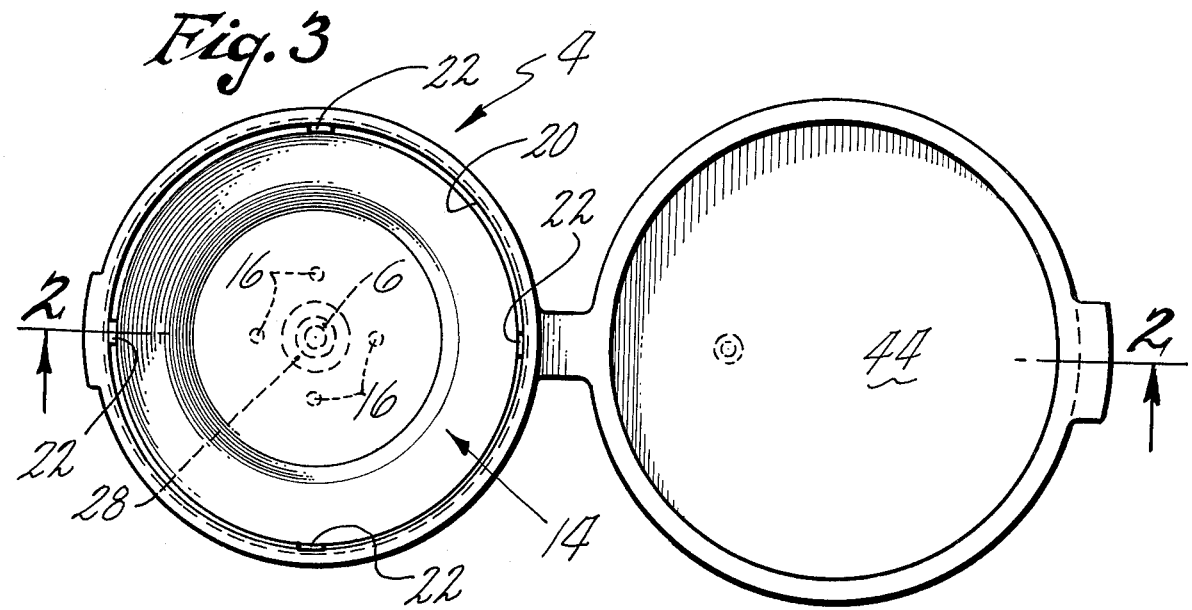
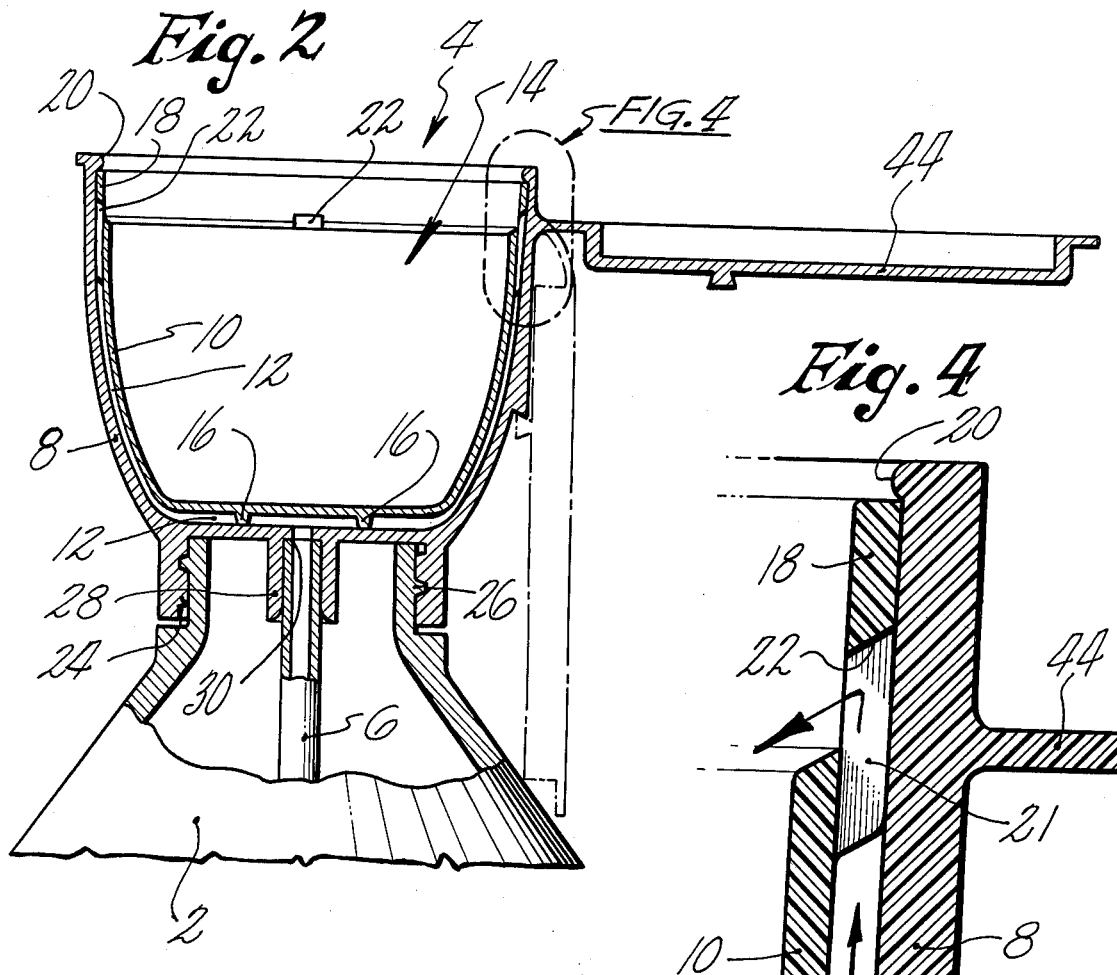

APPARATUS FOR MEASURING AND DISPENSING LIQUID

CROSS REFERENCE TO RELATED APPLICATION

The present application is related to copending U.S. patent application filed on the same date as this application Ser. No. 779,629 in the name of Robert J. Donoghue entitled APPARATUS FOR REMOVING NAIL POLISH.

BACKGROUND OF THE INVENTION

1. Field of the Invention

This invention relates to the measuring and dispensing of liquids and particularly to an apparatus for doing so which has no protuberances within the measuring and dispensing apparatus itself.

2. Description of the Prior Art

Dual compartment containers for dispensing measured quantities of liquid have been proposed heretofore; see for example, U.S. Pat. Nos. 3,347,420 and 3,581,953, both issued to the inventor of the present application, for possible forms of such containers. While both patents describe certain containers which have been found to be very useful in storing liquid in a container having a measuring and dispensing chamber disposed thereon, both suffer from one disadvantage: the measuring and dispensing chamber has an upstanding member therein which renders the measuring and dispensing chamber unusable for certain things. For example, it may be desirable to treat the teats of a milk cow with a cleansing or medicinal solution. It is not possible to insert the teat into the measuring and dispensing chamber taught in the patents discussed above because the upstanding member blocks entry. The upstanding member may also render the apparatus somewhat unsafe if it were desired to utilize the measuring and dispensing apparatus in conjunction with a reservoir container containing an eye wash solution since there exists the possibility that the user could poke his or her eye with the upstanding member. The apparatus for measuring and dispensing liquids of the present invention overcomes this disadvantage and provides a measuring and dispensing apparatus which may be utilized for the above-described purposes and others.

SUMMARY OF THE INVENTION

It is the object of the present invention to provide an apparatus for measuring and dispensing liquids, the measuring and dispensing chamber of which includes no members therein which interfere with the use thereof as a cup.

In accordance with the present invention an apparatus for measuring and dispensing liquid is provided by the combination of a reservoir container having a flexible wall; measuring and dispensing means disposed on the reservoir container, the measuring and dispensing means comprising an outer wall member and an inner wall member, the inner wall member being disposed within the outer wall member and spaced therefrom to define liquid passage means between the outer wall member and the inner wall member, the inner wall member defining a measuring chamber therewithin; means providing liquid communication between said liquid passage means and the measuring chamber; and conduit means disposed in the reservoir container and in liquid communication with said reservoir container and said liquid passage means.

The foregoing and other objects, features and advantages of the present invention will become more apparent in light of the following detailed description of a preferred embodiment thereof, as illustrated in the accompanying drawings.

BRIEF DESCRIPTION OF THE DRAWINGS

FIG. 1 is a sectioned elevation view of the apparatus for measuring and dispensing liquid in accordance with the present invention.

FIG. 2 is an enlarged sectioned view of one embodiment of the measuring and dispensing means of the present invention.

FIG. 3 is a top view of the apparatus shown in FIG. 2.

FIG. 4 is an enlarged sectioned view of the portion indicated by the dotted line in FIG. 2.

FIG. 5 is an elevation view of one embodiment of the inner wall member which forms the measuring chamber in accord with the present invention.

FIG. 6 is a partially sectioned elevation view of another embodiment of my invention.

FIG. 7 is a partial, sectioned view of still another embodiment of my invention.

DESCRIPTION OF THE PREFERRED EMBODIMENT

Referring to the drawings, wherein like numerals refer to like components, FIGS. 1–5 show a reservoir container 2 having a flexible wall and measuring and dispensing means, shown generally at 4, disposed thereon. Conduit means 6 extends from the measuring and dispensing means 4 into the container 2. The measuring and dispensing means 4 comprises an outer wall member 8 and an inner wall member 10. The inner wall member 10 is disposed within the outer wall member 8 and spaced therefrom to define liquid passage means 12 between the outer wall member 8 and the inner wall member 10. The inner wall member 10 is preferably cup shaped and defines a measuring chamber 14 therewithin. The inner wall member 10 may have spacing means 16 disposed on the bottom of the cup for spacing the inner wall member 10 from the outer wall member 8 and from the top of the conduit means 6 to provide the liquid passage means 12. The cup shaped inner wall member 10 preferrably also has a collar 18 disposed around its upper circumference to provide a seal between the outer wall member 8 and the inner wall member 10. The outer wall member 8 may have a sealing and locking ring 20 disposed about its upper inner periphery to hold the cup shaped inner wall member 10 in place and to cooperate with collar 18 to provide a seal therebetween. The collar 18 also has passage means 21 therein, which may include at least one hole 22 therethrough which is adapted to allow liquid to pass from the liquid passage means 12 into the measuring chamber 14.

As shown best in FIG. 2, the outer wall member 8 may have threads 24 thereon adapted to engage threads 26 on the neck portion of the container 2 so that the outer wall member 8 may be attached to the container 2. In such embodiment a boss 28 having a bore 30 therein is provided in the bottom portion of the outer wall means 8 to receive the conduit means 6 therein and to provide liquid communication between the conduit means 6 and the liquid passage means 12.

In another embodiment, shown in FIG. 6, the outer wall member 8 may be made integral with the container 2. In this embodiment the outer wall member 8 and the container 2 form throat means 32 where the outer wall member joins the container. Plug means 34 having a bore 36 therein is disposed in the throat means 32. The bore 36 is adapted to receive the conduit means 6 therein and to provide liquid communication between the conduit means 6 and the liquid passage means 12.

FIG. 7 shows a slightly different embodiment in which the plug 38 is integral with the inner wall member 10. The plug 38 has a passage means 42 therein in liquid communication with the bore 36 to allow liquid to pass from conduit 6 into the liquid passage 12.

The liquid and dispensing means 4 may be provided with different types of closures if desired. As shown in FIGS. 1-4, a friction or snap cap 44 may be provided and may be integral with the outer wall member 8.

FIGS. 6 and 7 show a different closure arrangement in which the outer wall member 8 may be provided with threads 46 thereon adapted to engage with threads 48 on a closure cap 50.

In operation, which is identical in all embodiments, the flexible wall container 2 is filled with the desired liquid and the measuring and dispensing means 4 disposed on the container 2. The conduit means 6 is of a length sufficient to reach from its upper end in the bore 30 in the boss 28 (FIGS. 1 and 2) or in the bore 36 in the plug 34 (FIG. 6) or 38 (FIG. 7) to a point proximate to the base 52 of the container 2. The user squeezes the wall of the container 2 as shown in FIG. 1, and liquid is displaced therefrom through conduit means 6, the liquid passage means 12 between the outer wall member 8 and the inner wall member 10, the liquid passage means 21 and the hole therein 22, and into the measuring chamber 14. When the user releases the pressure being applied to the container 2, the liquid flow will cease. The user is thus able to accurately measure and dispense a desired amount of liquid from the container 2 into the measuring chamber 14. If the level of liquid forced into the measuring chamber 14 should go above the hole 22 in the cup shaped inner wall member 10, the excess liquid will be drawn back into the container 2 in a reverse direction when the user releases the pressure on the flexible wall of the container 2.

There has thus been described an apparatus for measuring and dispensing liquid in accordance with the present invention. It should be understood by those skilled in the art that various changes and omissions in the form and detail thereof may be made therein without departing from the spirit and scope of the invention, which is to be limited only as set forth in the following claims.

What I claim as new and desire to secure by Letters Patent of the United States is:

1. Apparatus for measuring and dispensing liquid comprising
 a reservoir container having a flexible wall;
 measuring and dispensing means disposed on said reservoir container, said measuring and dispensing means comprising an outer wall member and an inner wall member, said inner wall member being disposed within said outer wall member and spaced therefrom to define liquid passage means between said outer wall member and said inner wall member, said inner wall member defining a measuring chamber therewithin;
 liquid communication means between said liquid passage means and said measuring chamber; and
 liquid transfer means in communication with said reservoir container and said liquid passage means, whereby liquid may be transferred into said measuring chamber from said reservoir container, through said liquid transfer means, said liquid passage and said liquid communication means.

2. Apparatus for measuring and dispensing liquid as defined in claim 1 wherein said inner wall member defining said measuring chamber is cup shaped, said cup shaped inner wall member spaced from said outer wall member, and seal means disposed around the upper circumference of said wall members, and wherein said means providing communication between said liquid passage means and said measuring chamber comprises at least one opening through said inner wall chamber.

3. Apparatus for measuring and dispensing liquid as defined in claim 1, wherein said reservoir container and said outer wall member are integral, said outer wall member and said reservoir container defining a throat where said outer member integrally joins said reservoir container, and plug means disposed in said throat, said plug means having a bore therein adapted to receive one end of said liquid transfer means, whereby liquid may be transferred from said reservoir container through said liquid transfer means and said plug means and into said liquid passage means.

4. Apparatus for measuring and dispensing liquid as defined in claim 1, wherein said reservoir container includes a neck portion having threads thereon said outer wall member having threads thereon adapted to engage said threads on said neck portion, said outer wall member also having a boss disposed thereon, said boss having a bore therein adapted to receive one end of said liquid transfer means, whereby liquid may be transferred from said reservoir through said conduit means and into said liquid passage means.

5. Apparatus for measuring and dispensing liquid as defined in claim 3, wherein said inner wall member defining said measuring chamber is cup shaped, seal means around the upper circumference of said cup shaped inner wall member, said seal means providing communication between said liquid passage means and said measuring chamber comprising at least one opening through said inner wall member and wherein the bottom of said cup shaped inner wall member is spaced from said plug means.

6. Apparatus for measuring and dispensing liquid as defined in claim 4, additionally comprising:
 closure engaging means disposed around the upper circumference of said outer wall member; and
 closure means including means adapted to secure said closure means to said outer wall means.

7. Apparatus for measuring and dispensing liquid as defined in claim 6, wherein said closure means has a portion thereof connected to said outer wall means.

8. Apparatus for measuring and dispensing liquid as defined in claim 2 wherein said seal means comprises a collar integrally defined on said inner wall member.

9. Apparatus for measuring and dispensing liquid as defined in claim 2 additionally comprising spacing means to space said inner and outer wall members from one another.

10. Apparatus for measuring and dispensing liquid as defined in claim 1 wherein said inner wall member defines an integral depending plug means received in a throat defined by said reservoir container, said plug means having a bore for receiving one end of said liquid transfer means, and said plug means defining a portion of said liquid passage means to provide communication between said reservoir and said liquid passage means.

* * * * *